(12) United States Patent
Parker, III et al.

(10) Patent No.: US 8,533,258 B2
(45) Date of Patent: Sep. 10, 2013

(54) BIDIRECTIONAL SYNCHRONIZATION WITH CRM APPLICATIONS

(75) Inventors: Wayne Parker, III, Seattle, WA (US); Navin Thadani, Bothell, WA (US); Tong Gao, Redmond, WA (US); Indrojit Deb, Sammamish, WA (US); Praveen Upadhyay, Bellevue, WA (US); Ian Legler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 12/908,493

(22) Filed: Oct. 20, 2010

(65) Prior Publication Data

US 2012/0102232 A1     Apr. 26, 2012

(51) Int. Cl.
*G06F 15/16*     (2006.01)
*G06F 7/00*     (2006.01)

(52) U.S. Cl.
USPC ............ 709/203; 707/612; 707/614; 707/635

(58) Field of Classification Search
USPC ............... 709/206, 248, 203; 707/610–639
See application file for complete search history.

(56) References Cited

U.S. PATENT DOCUMENTS

| | | | |
|---|---|---|---|
| 7,558,783 B2 * | 7/2009 | Vadlamani et al. | 1/1 |
| 7,720,920 B2 | 5/2010 | Singh et al. | |
| 7,783,712 B2 | 8/2010 | Azam et al. | |
| 8,041,675 B1 * | 10/2011 | McCain | 707/640 |
| 2002/0116405 A1 * | 8/2002 | Bodnar et al. | 707/202 |
| 2006/0069684 A1 * | 3/2006 | Vadlamani et al. | 707/10 |
| 2008/0104133 A1 * | 5/2008 | Chellappa et al. | 707/201 |
| 2008/0165161 A1 | 7/2008 | Platzer et al. | |

OTHER PUBLICATIONS

"Synchronize your calendar and contact data with Outlook", Retrieved at << http://www.teamspace.com/outlook-synchronization.html >>, Retrieved date Sep. 29, 2010, pp. 2.
"Outlook Integration for Amdocs CRM 6", Retrieved at << http://www.crm-outlook-integration.com/docs/Whitepaper.pdf >>, 2007, pp. 1-11.
"Outlook to SQL Synchronization using MX-Sync", Retrieved at << http://www.exchangewise.com/Downloads/Documents/OutlookWise_Outlook_SQL_Synchronization.pdf >>, Sep. 28, 2010, pp. 5.

* cited by examiner

*Primary Examiner* — Jeong S Park
(74) *Attorney, Agent, or Firm* — Turk IP Law, LLC (57) ABSTRACT

Synchronization between email, contact management, scheduling (ECS) and customer relationship management (CRM) applications is facilitated through a synchronization module on the ECS side using an Extensible Markup Language (XML) file for keeping track of synchronization states. The CRM server version of an item is compared with the XML file to detect changes and the same performed for the ECS item. The changes are then pushed to the corresponding item for the columns that have changed. Last updated item is selected in case of a conflict.

19 Claims, 7 Drawing Sheets

BIDIRECTIONAL SYNCHRONIZATION WITH CRM APPLICATIONS

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales, marketing, and/or customer service organizations target new customers, manage marketing campaigns, and drive sales activities. CRM systems may include many components, hardware and software, utilized individually or in a shared manner by users internal or external to the organization.

CRM systems are an example of computing systems where data associated with entities such as persons, organizations, accounts, and similar ones are maintained for various purposes. Some of the information collected and maintained by CRM applications may also be collected by other common applications such as email, contact, and/or scheduling applications (for example, Outlook® by Microsoft Corporation of Redmond, Wash.). When users have similar information maintained by two or more applications, a logical action is to synchronize the information in order to enhance efficiency and accuracy. While some applications are capable of synchronizing maintained information, conventional synchronization approaches are relatively unreliable, resource-expensive, and cannot take full advantage of enhanced capabilities such as delegation or search.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling synchronization of information between a CRM application and an email, contact, scheduling (ECS) application through a synchronization module. According to some embodiments, online and offline versions of the ECS application may be enabled to synchronize data associated with contacts, emails, scheduling events, and properties with data maintained by the CRM application through a background process employing one or more tables. In addition to ensuring efficient synchronization, delegations may be accommodated and enhanced search capabilities of the ECS application utilized in determining relevant data for the CRM application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, bidirectional synchronization between ECS and CRM applications may be facilitated through a synchronization module on the ECS side using an Extensible Markup Language (XML) file for keeping track of synchronization states. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing CRM and/or email, contact, scheduling based services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

The combined term ECS application is used herein to collectively describe hosted and/or local applications that provide email, scheduling, contact management, calendaring, and similar services. An example of such applications is Outlook® by Microsoft Corp. of Redmond, Wash. Such applications may provide one or more of the above listed functionality through a number of user interfaces. They may be executed on a server as a hosted service and accessed by users through thin clients such as browsers or locally executed client applications. Some of the services may be provided online, others may be provided offline. For simplicity, such applications are referred to collectively as ECS applications.

Figure 1:
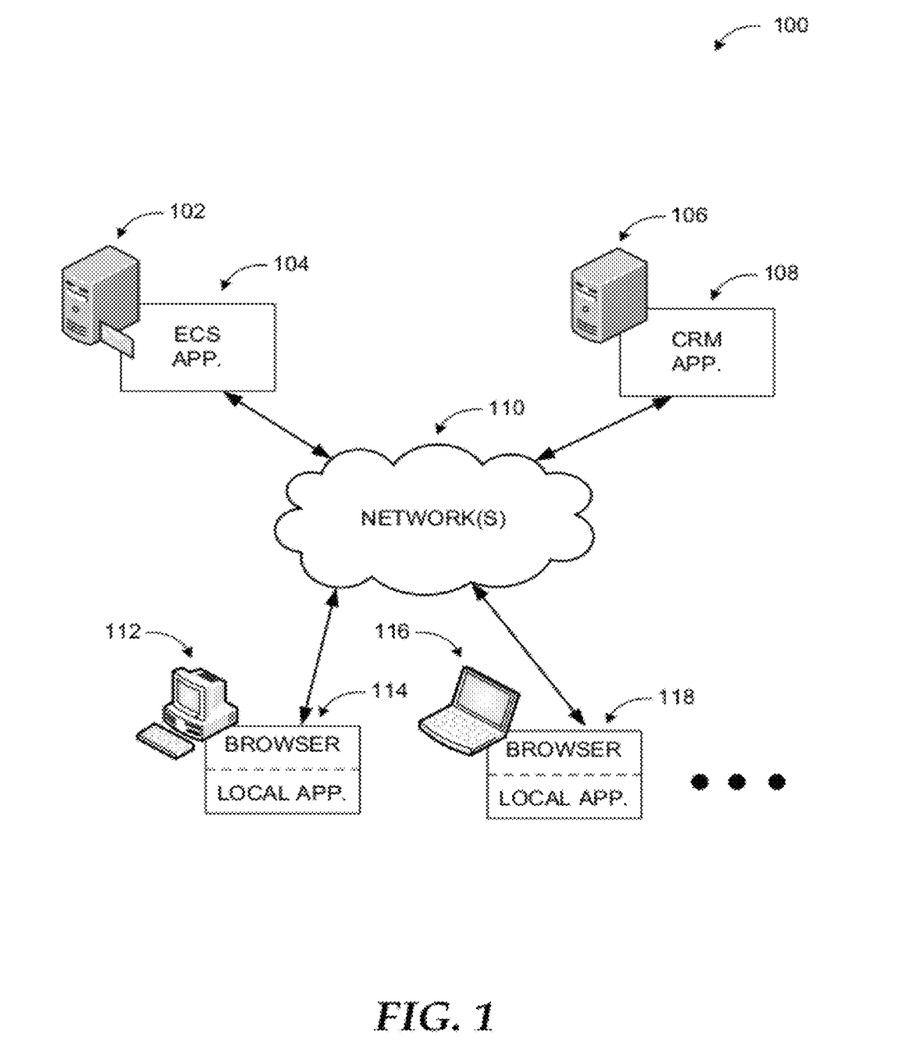
FIG. 1 illustrates a networked environment, where CRM and ECS applications may be synchronized according to some embodiments.

Referring to FIG. 1, diagram 100 illustrates a networked environment, where CRM and ECS applications may be synchronized according to some embodiments. The computing devices and computing environments shown in diagram 100 are for illustration purposes. Embodiments may be implemented in various local, networked, and similar computing environments employing a variety of computing devices and systems.

In an example environment illustrated in diagram 100, users may access a CRM application 108 executed on a CRM server 106 through a browser or client application (114, 118) executed on their computing devices 112, 116 via network(s) 110. The users may also access email, contact management, and/or scheduling services managed by an ECS application 104 executed on server 102 through the same or different browser or client application (114, 118) executed on their computing devices 112, 116 via network(s) 110. Some of the tasks associated with the ECS services may be performed online, while others may be performed offline. In case of dedicated client applications, the client application is sometimes referred to as offline client when it is operating without a connection to the ECS application 104. When the client application is in contact with the ECS application 104, it may be referred to as online client.

Both, ECS application 104 and CRM application 108 may collect and maintain information such as contact information, appointment/meeting information, email data, and comparable information. To avoid duplication of information on ECS and CRM sides, as well as to prevent conflicting data from being used, bidirectional synchronization may be performed employing a synchronization module executed in conjunction with the ECS client application(s).

Conventional synchronization approaches rely on messaging architecture and a Component Object Model, such as Messaging Application Programming Interface (MAPI)/RPC on change events, which may be inherently unreliable. Furthermore, column level discrepancies may not be reconciled between the server and the client, so that one always overwrites all data on the other. Additionally, conventional synchronization methods typically process on a foreground UI thread, causing the ECS client to hang while processing occurs. Traditional ECS applications do not allow delegated or shared mailboxes to be synchronized and do not take advantage of enhanced search capabilities.

Both the online and offline versions of an ECS client according to embodiments may enable synchronization of CRM contacts and CRM activities to ECS folders or ECS synchronization module. The ECS synchronization module enables ECS users to view CRM information, including contacts, tasks, phone calls, letters, faxes, appointments, and e-mails, within the ECS user interface. The online and offline synchronization processes manage replication of data back and forth between CRM database(s) and local database(s) on a computer running the offline client. An offline synchronization process may manage replication of information from the CRM database(s) to the offline client. On the other hand, an online synchronization process may manage replication of changes in the local data store from the offline client to the CRM database(s) when offline client reconnects to the network.

Synchronization between email, contact management, scheduling (ECS) and customer relationship management (CRM) applications is facilitated through a synchronization module on the ECS side using an Extensible Markup Language (XML) file for keeping track of synchronization states. The CRM server version of an item is compared with the XML file to detect changes and the same performed for the ECS item. The changes are then pushed to the corresponding item for the columns that have changed. Last updated item is selected in case of a conflict.

Changes on the ECS side performed through a low level programming interface such as MAPI, which causes the synchronization module to perform its operations using a background thread, improving perceived performance by the user. MAPI is a messaging architecture that allows client programs to become (e-mail) messaging-enabled, -aware, or -based by calling MAPI subsystem routines that interface with messaging servers. MAPI includes facilities to access message transports, message stores, and directories. Delegation such as sharing of mailboxes is accommodated for users who mark those items for synchronization to CRM. Delegated items to be synchronized may be tagged by a delegated user, flow through the ECS service to the primary user, and synchronized to the CRM system avoiding some race conditions and preventing duplicates from being created on the CRM server. Thus, delegated items may be synchronized through an indirect synchronization process via the ECS server.

Computing devices 112 and 116 may be any computing device including, but not limited to, desktop computers, laptop computers, servers, handheld computers, vehicle mount computers, smart phones, and comparable devices.

Figure 2:
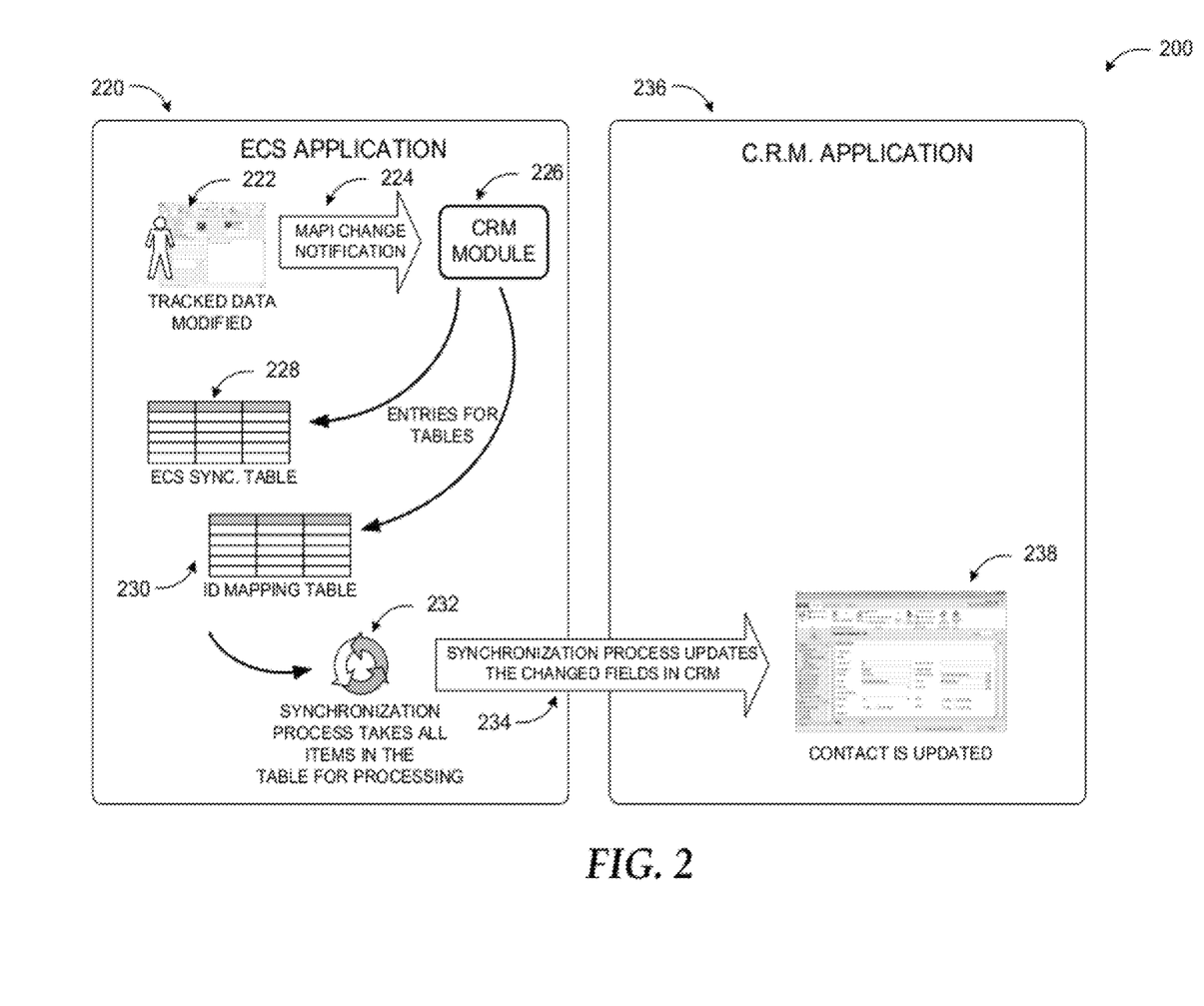
FIG. 2 illustrates example actions and components in synchronization of a CRM application based on changes at an ECS application.

FIG. 2 illustrates in diagram 200 example actions and components in synchronization of a CRM application based on changes at an ECS application. Individual items (e.g., contacts, tasks, appointments, and emails) may be marked for synchronization in several ways. After marking an item for synchronization, two copies of that item exist: one copy residing in ECS application 220 and the other copy residing in CRM application 236. In addition, modifications made to either copy of the item may be replicated in the other system via the synchronization process 232 managed by the CRM module 226. According to some embodiments, users may be enabled to control which ECS items are to be synchronized to the CRM application by using a tracking control associated with the CRM application.

For items that are modified in ECS application 220, the process for synchronizing those changes with items in CRM application 236 may include ECS synchronization process 232 detecting changes (222) by monitoring MAPI change notifications 224, which ECS application 220 may generate whenever an item is altered. When a MAPI notification is detected at the CRM modules 226 for an item that is marked for synchronization, an entry recording this may be added to an ECS synchronization table 228 in the ECS client cache.

This ensures that changes to CRM tracked items inside ECS are retrieved by the CRM application 236 even when these changes occur in absence of the CRM module 236.

The ECS client cache, created by the CRM module 236, may be a compact database that is located on the client and is used to store information about synchronized items for use by the synchronization process. The cache may contain information that is necessary to identify and locate items in ECS and CRM, as well as changes to those items that are made by either system, to re-attempt synchronization for changes that fail to synchronize. This ensures that the CRM module has a ready reference to establish whether a change indicates that a new record needs to be added or that it requires an existing record to be modified without doing resource-costly scans on ECS. As a result faster synchronization may be accomplished without significant impact on ECS performance.

Under certain circumstances, for example, if a change occurs before the CRM module 236 is fully loaded, the CRM module 236 may miss MAPI notifications. To mitigate such scenarios, installation of the CRM module 236 may create a MAPI contents table (or ID Mapping Table 230), which stores all items that are marked for synchronization, sorted in reverse order based on modification date. As a result, any missed change notifications (except for delete notifications) may be retrieved the next time the system scans the ID Mapping Table 230 for the synchronized folders for all items that have been changed since the last synchronization occurred. Items in ID Mapping Table 230 may be processed one by one until the last synchronization time is reached.

Thus, the ECS client cache contains at least two tables: the ID Mapping Table 230 and the ECS synchronization table 228. For items that have been deleted, a periodic reconciliation may be performed to look at items in the ECS client cache and to verify the existence of the items in the ECS data store. If an item cannot be found, a deletion entry may be added to the ECS synchronization table 228. Two example tables with example data and value types are shown below.

TABLE 1

Example ID Mapping Table

| Column | Value Type |
| --- | --- |
| MapID | Primary Key |
| CRMID | Unique Identifier |
| EntryID | Variable character string |
| ObjectType | Integer |
| DeletedLocally | Bit |
| Visited | Bit |
| VerifiedTime | Date & time |

TABLE 2

Example ECS Synchronization Table

| Column | Value Type |
| --- | --- |
| ChangeID | Primary Key |
| MapID | Foreign Key |
| OutlookTimestamp | Date & time |
| OutlookChange | Integer |
| CRMTimestamp | Date & time |
| CRMChange | Integer |

Synchronization process 232 may retrieve the items from the tables for processing and update the changed fields in the CRM application (234). For example, changes to a contact in ECS application 220 may be reflected in the contact information 238 in CRM application 236 following the synchronization process 232.

Figure 3:
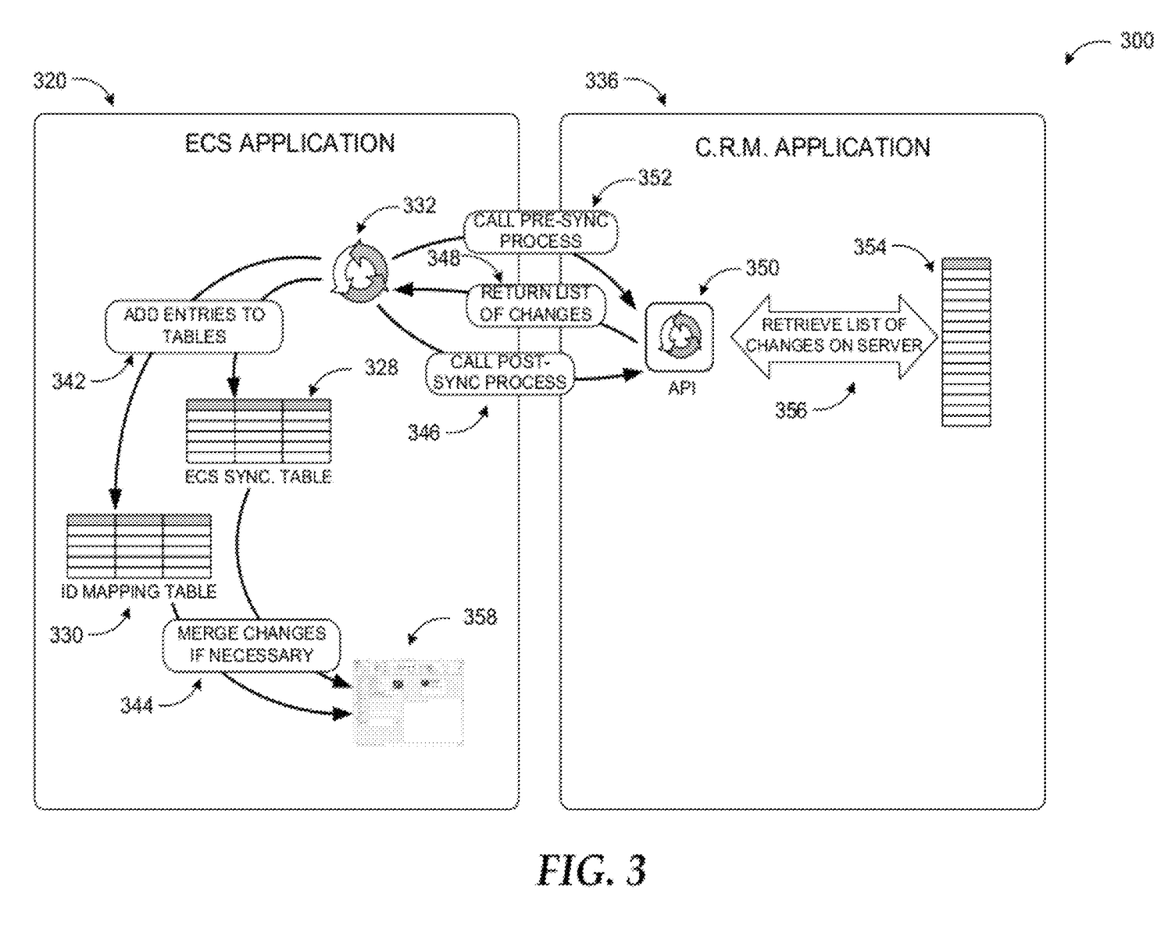
FIG. 3 illustrates example actions and components in synchronization of an ECS application based on changes at a CRM application.

FIG. 3 illustrates in diagram 300 example actions and components in synchronization of an ECS application based on changes at a CRM application. Changes on the CRM application (336) side may be retrieved by the synchronization process 332 calling (352) prepare synchronization Application Programming Interface (API) 350 on the CRM server, which identifies a number of items on the CRM server that have changed (356) for a particular client and returns (348) that summary information since the last time a successful synchronization of such changes was performed. With this information, a call to retrieve synchronization data (346) may be made against the server with a column set 354 that contains the CRMID and the time stamp of the changed items.

For the items retrieved in this way, a post-synchronization API may be called to identify to the CRM server that the change on each item has been processed. The items may then be added (342) to the ECS client cache in the ECS synchronization table 328 for later processing. ECS application 320 may also include ID Mapping Table 330 and merge the changes from both tables if necessary (344) resulting in an updated item 358 (e.g., an updated contact card).

In a system according to embodiments, synchronization is bi-directional. Thus, the ECS application 320 synchronizes with the CRM application 336 and vice versa. After the synchronization process is performed, the most recent synchronized version of an item may be saved in XML format and stored in a property of the item. An XML BLOB (Binary Large Object), which is essentially a large XML file.

When an item is changed in either ECS or CRM, the item may be synchronized such that the change appears in both systems by comparing column differences using the XML record on the item from ECS and timestamps of the changes. When an item is changed in both ECS and CRM, bi-directional synchronization may occur according to the timestamps of the changes, so that the most recent change takes precedence and overrides any earlier ones.

For example, when a synchronized item is altered in CRM after a change on the corresponding item in ECS, CRM to ECS synchronization may be performed to synchronize the latest changes that have been made to the item in CRM over to the corresponding item in ECS, and the XML record associated with the ECS item may be updated. Then, the system may perform an ECS to CRM synchronization to ensure that the latest changes to the ECS item are synchronized with the corresponding item in CRM.

Figure 4:
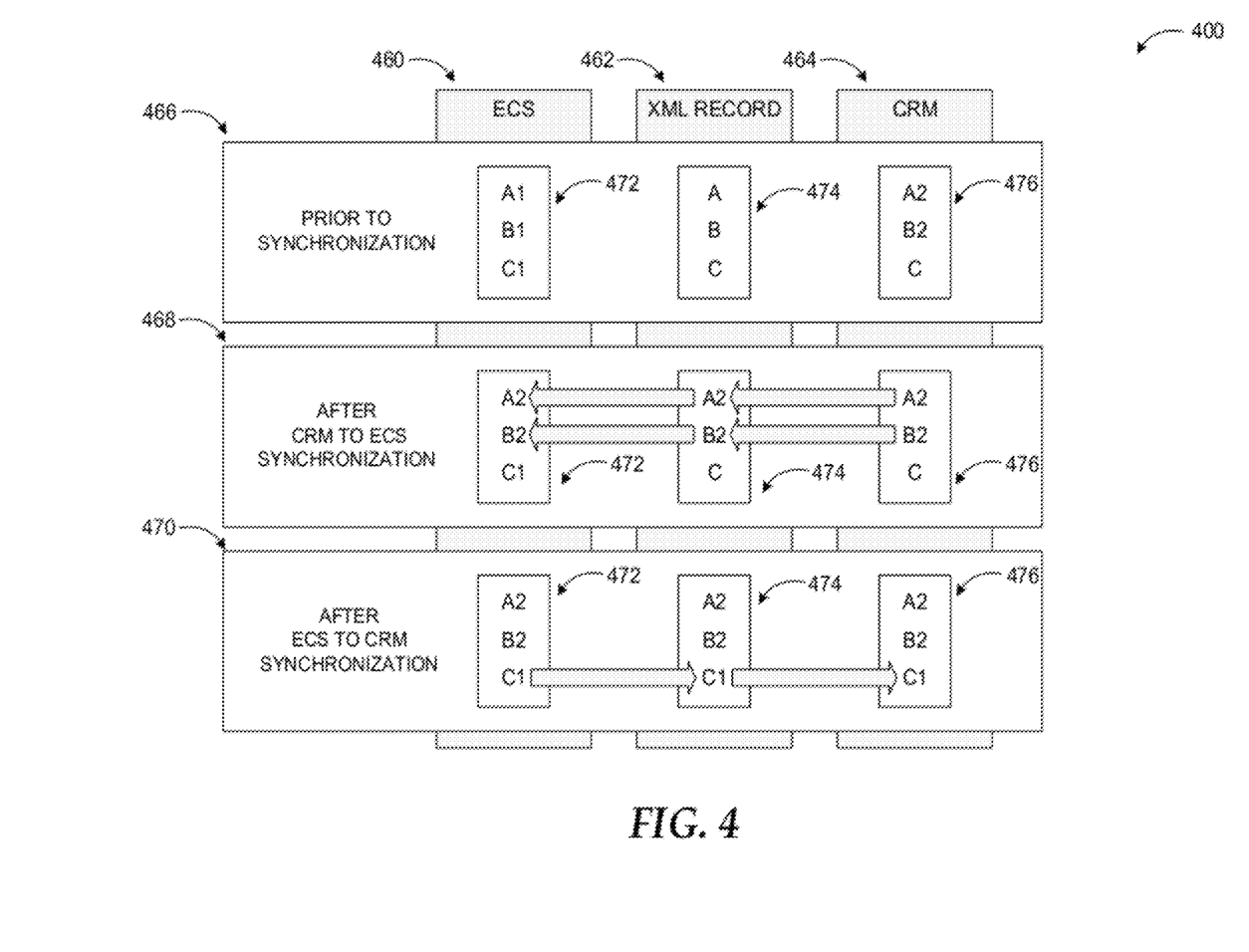
FIG. 4 illustrates updating of records prior to and following synchronization in a system according to some embodiments.

FIG. 4 illustrates updating of records prior to and following synchronization in a system according to some embodiments. Diagram 400 provides an example of the process associated with merging overlapping changes between CRM and ECS.

According to the example scenario, prior to synchronization (466), an ECS user makes changes to three fields (A1, B1, and C1) 472 in an item in ECS 460. XML file 462 maintains original record of the item (A, B, and C) 474. At a later time, the same or another user makes changes to corresponding item in CRM 464, modifying two of the same fields (A2 and B2) 476 modified earlier by the ECS user. As a result, the CRM timestamp is more recent than the corresponding ECS timestamp.

During first phase of synchronization 468, the more recent field values in the CRM system (A2 and B2) 476 may be copied to the XML file 462 and then to the item in ECS 460, overwriting the earlier changes (A1 and B1) made to the item in ECS 460. When CRM to ECS synchronization (468) is complete, ECS to CRM synchronization 470 may occur, and the more recent field value in ECS 460 (C1) may be copied to the XML file 462 and then to the item in CRM 464, overwriting the original value (C).

In a system according to embodiments, the synchronization of ECS with CRM may be triggered when a user marks an item for synchronization or alters an ECS object (such as a contact). Synchronization may also be triggered in response to the user manually initiating ECS synchronization with CRM or a background synchronization operation beginning on a periodic basis. Manual as well as background synchronization may results in immediate replication of changes between ECS and CRM. When a user marks an item for synchronization or alters an ECS object, the synchronization process may not always happen immediately (e.g., to allow time for the user to complete a series of changes).

The examples in FIG. 2 through 4 have been described with specific configurations and components. Embodiments are not limited to systems according to these example configurations and components. Bidirectional synchronization between CRM and ECS applications may be implemented in configurations using other types of components, processes, and configurations in a similar manner using the principles described herein.

Figure 5:
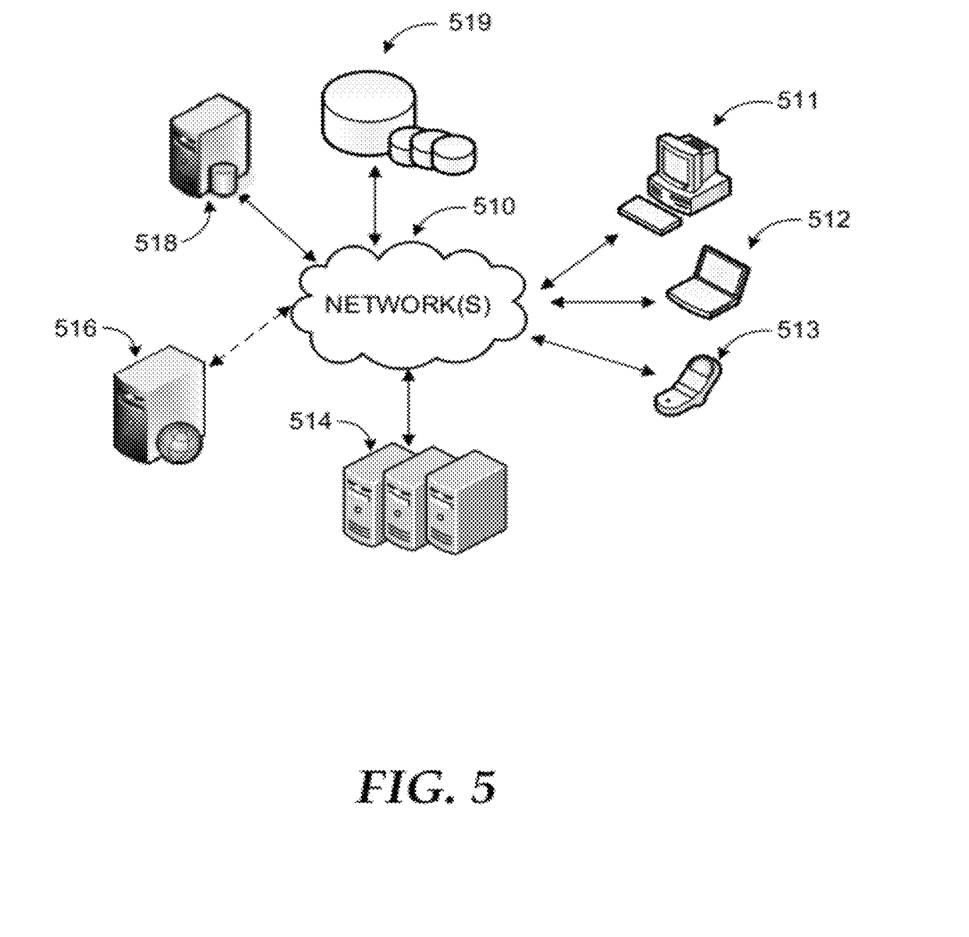
FIG. 5 is a networked environment, where a system according to embodiments may be implemented.

FIG. 5 is an example networked environment, where embodiments may be implemented. A system for bidirectional synchronization between CRM applications and ECS applications may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications with an ECS application executed on one or more of servers 514 and a CRM application executed on server 516. A synchronization module executed in conjunction with a client ECS application one any one of the client devices 511-513 may facilitate bidirectional synchronization of various forms of data maintained by the ECS application and the CRM application as discussed previously. The CRM and/or ECS applications may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing bidirectional synchronization between ECS and CRM applications. Furthermore, the networked environments discussed in FIG. 5 are for illustration purposes only. Embodiments are not limited to the example applications, modules, or processes.

Figure 6:
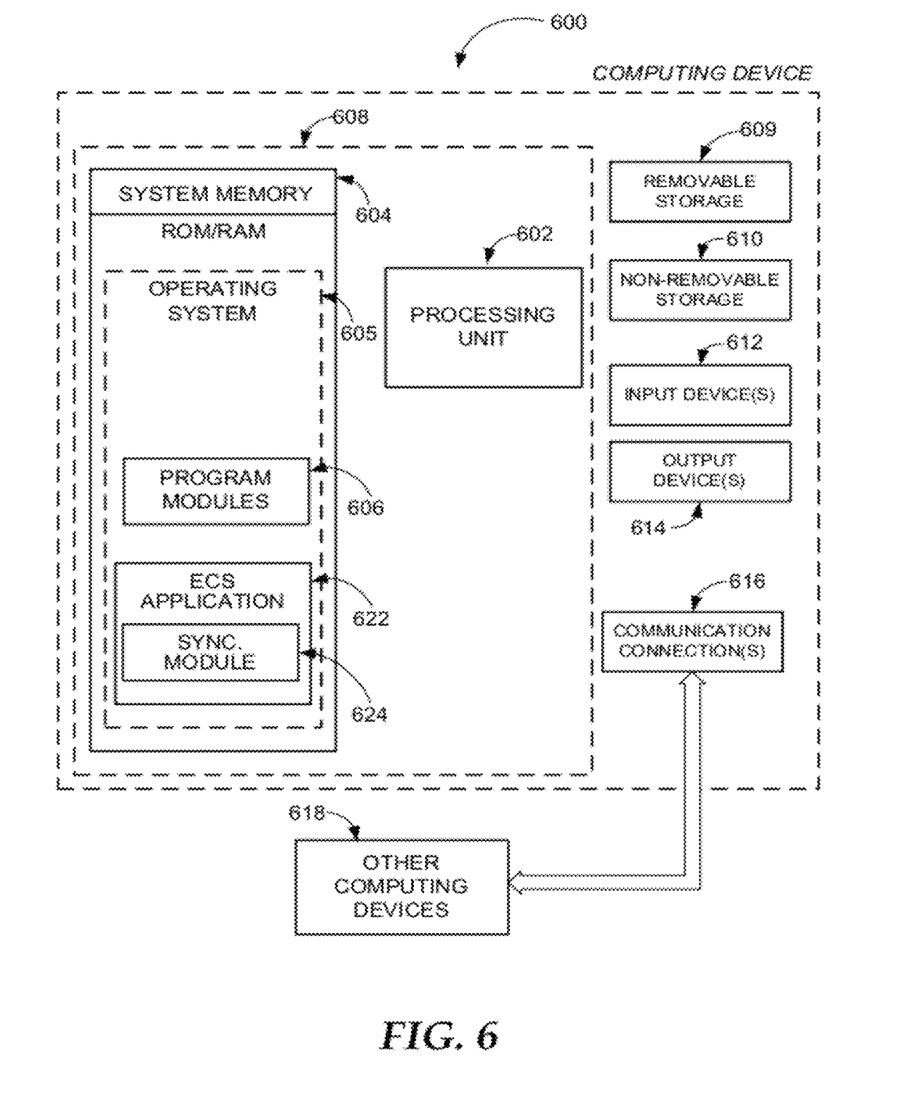
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of providing email, contact management, scheduling, and similar services, as well as access to a CRM application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, ECS application 622, and synchronization module 624.

ECS application 622 may provide email, scheduling, contact management, and comparable services in conjunction with a hosted service. Synchronization module 624 may enable bidirectional synchronization of data such as contact information, email data, scheduling information, etc. between the ECS application 622 and a CRM application using a background process and enabling enhanced features such as delegation accommodation, search capability, and the like. ECS application 622 and synchronization module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
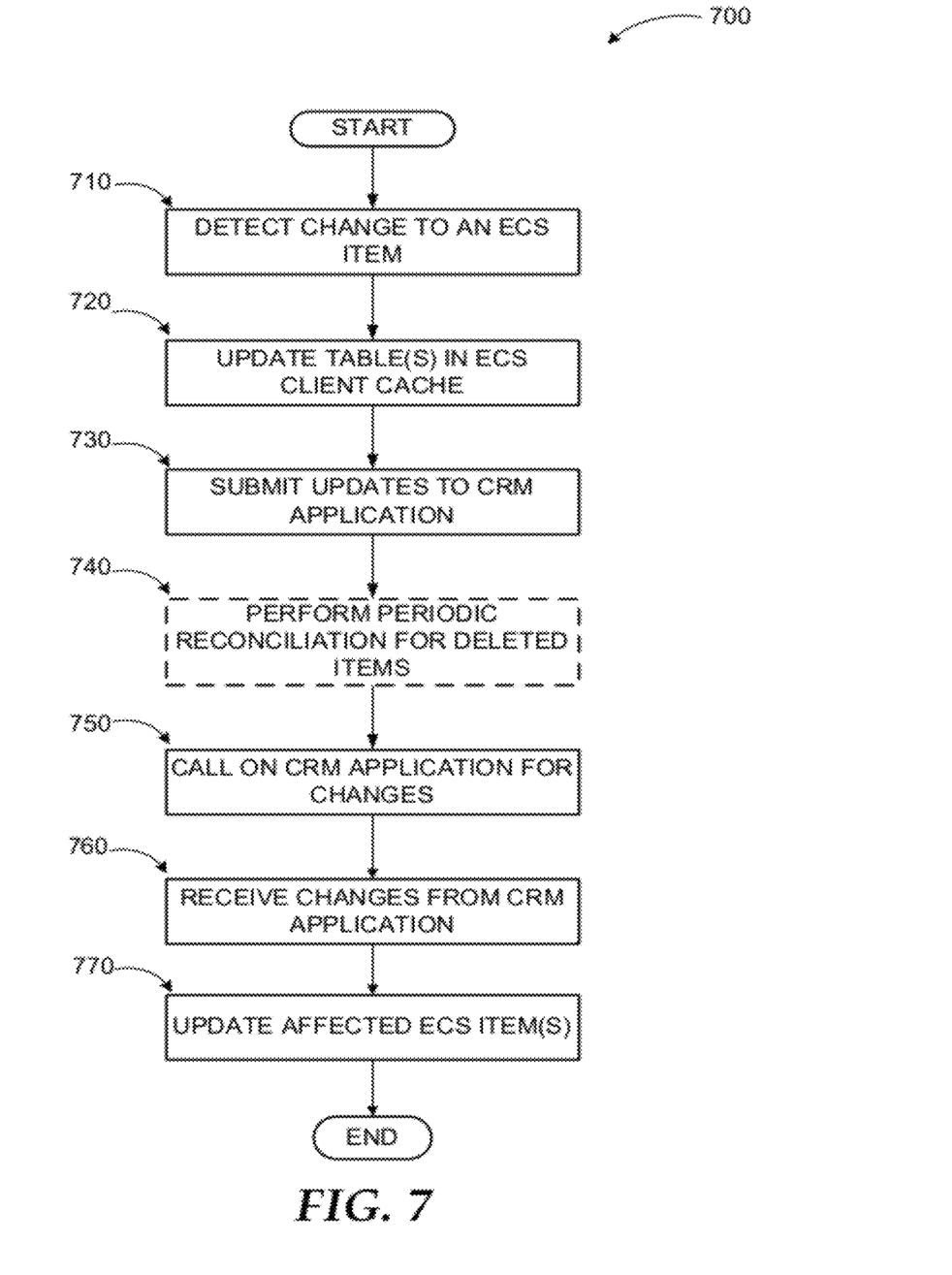
FIG. 7 illustrates a logic flow diagram for a process of synchronizing ECS and CRM application data according to embodiments.

FIG. 7 illustrates a logic flow diagram for process 100 of synchronizing ECS and CRM application data according to embodiments. Process 700 may be implemented on a client device.

Process 700 begins with operation 710, where a change to an ECS item is detected through a MAPI notification by a CRM module operating in conjunction with an ECS client application. The change may trigger updating of an ECS synchronization table and/or an ID Mapping Table in an ECS client cache at operation 720. The entries to the tables may be processed and updates submitted to a CRM application maintaining a similar record at operation 730. The ECS to CRM synchronization may be performed when a user marks the item for synchronization or alters the item, in response to the user manually initiating the synchronization, or a background synchronization operation beginning on a periodic basis. Following the synchronization with the CRM application, a periodic reconciliation operation may be performed to ensure deleted items are accounted for at optional operation 740.

For changes on the CRM side, a call may be made at operation 750 to an API at the CRM application requesting and in response receiving summary information on changes since the last time a successful synchronization of changes was performed. With this information, a call to retrieve synchronization data may be made against the CRM server with a column set that contains the CRM ID and the time stamp of the changed items and changes received at operation 760. The ECS client may then update affected items in the ECS application at operation 770.

The operations included in process 700 are for illustration purposes. Bidirectional synchronization between ECS and CRM applications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for bi-directionally synchronizing items between an email, contact management, scheduling (ECS) application and a customer relationship management (CRM) application, the method comprising:
    detecting a change to an item maintained by the ECS application at a CRM module integrated to the ECS application;
    updating one or more tables in an ECS client cache with records associated with the detected change;
    processing the records in the one or more tables;
    submitting the change to the CRM application;
    calling on the CRM application to retrieve changes to items maintained by the CRM application;
    retrieving at least one change to an item maintained by the CRM application;
    updating the item maintained by the ECS application corresponding to the changed item maintained by the CRM application; and
    in response to a failure to update the CRM application, re-attempting to update the CRM application by retrieving the detected change through another scan of the one or more tables in the ECS client cache and submitting the detected change to the CRM application.

2. The method of claim 1, wherein the change to the item maintained by the ECS application is detected by receiving a Messaging Application Programming Interface (MAPI) notification at the CRM module.

3. The method of claim 1, wherein the one or more tables in the ECS client cache include:
    an ECS synchronization table for storing records associated with changed items maintained by the ECS and the CRM applications and changes to the items; and
    a contents table for storing items marked for synchronization.

4. The method of claim 3, wherein the contents table stores items marked for synchronization sorted in reverse order based on modification date and the items in the contents table are processed one-by-one until a last synchronization time is reached.

5. The method of claim 3, wherein the contents table is created upon installation of the CRM module in the ECS application.

6. The method of claim 1, further comprising:
    performing a reconciliation process for deleted items comparing contents of the ECS client cache to an ECS data store and adding a deletion entry to an ECS synchronization table if an item in the ECS client cache no longer exists in the ECS data store.

7. The method of claim 6, wherein the reconciliation process is performed in response to one of expiration of a predefined period and a completion of a synchronization process.

8. The method of claim 1, further comprising:
    receiving a summary information associated with changed items at the CRM application in response to the call;
    calling on the CRM application with a column set that includes a CRM identifier and a time stamp of the changed items; and
    adding at least one entry associated with the received at least one change to the ECS client cache.

9. The method of claim 8, further comprising:
    calling on the CRM application to identify to a CRM server executing the CRM application that the at least one change is processed at the ECS application.

10. The method of claim 1, wherein the items maintained by the ECS application and the CRM application include at least one from a set of: a contact, a task, a meeting, an appointment, a phone call record, a letter, an email, and a fax.

11. A computing device for facilitating access to email, contact management, scheduling (ECS) and customer relationship management (CRM) services, the computing device comprising:
- a memory;
- a processor coupled to the memory, the processor executing an ECS application and a CRM module integrated to the ECS application, the CRM module configured to:
  - detect a change to an item maintained by the ECS application through a Messaging Application Programming Interface (MAPI) notification;
  - update a contents table in an ECS client cache with records associated with changed items and an ECS synchronization table in the ECS client cache with time stamps associated with the records in the contents table;
  - manage a synchronization process for submitting change updates to a CRM application based on the tables;
  - call on the CRM application to retrieve changes to items maintained by the CRM application;
  - retrieve at least one change to an item maintained by the CRM application;
  - update an item maintained by the ECS application corresponding to the changed item maintained by the CRM application;
  - enable synchronization of delegated items at the ECS application by enabling delegated items to be tagged by a delegate for synchronization; and
  - avoid at least one race condition and prevent at least one duplicate item from being created on the CRM application through an indirect synchronization process of the delegated item via the ECS application.

12. The computing device of claim 11, wherein the CRM module is further configured to initiate the synchronization process in response to one of:
- the item maintained by the ECS application being one of: marked for synchronization and altered;
- receiving a request from a user for synchronization; and
- expiration of a predefined period.

13. The computing device of claim 11, wherein the synchronization process is executed employing a background user interface thread.

14. The computing device of claim 11, wherein the ECS client cache is a compact database maintained in the memory for storing information associated with synchronized items.

15. The computing device of claim 14, wherein the information associated with the synchronized items includes identification data and location data for items on the ECS and the CRM applications, and change information from the ECS and the CRM applications for changed items.

16. A computer-readable memory device with instructions stored thereon for bi-directionally synchronizing items between an email, contact management, scheduling (ECS) application and a customer relationship management (CRM) application, the instructions comprising:
- detecting a change to an item maintained by the ECS application at a CRM module integrated to the ECS application;
- updating the CRM application with the detected change employing one or more tables in an ECS client cache for storing changed item records;
- updating an item maintained by the ECS application corresponding to a changed item maintained by the CRM application by calling on the CRM application with a request for changes;
- enabling synchronization of delegated items at the ECS application by enabling delegated items to be tagged by a delegate for synchronization;
- avoiding at least one race condition and preventing at least one duplicate item from being created on the CRM application through an indirect synchronization process of the delegated items via the ECS application;
- in response to a failure to update the CRM application, re-attempting to update the CRM application by retrieving the detected change through another scan of the one or more tables in the ECS client cache and submitting the detected change to the CRM application; and
- saving a most recent change record associated synchronized items in an Extensible Markup Language (XML) format as a property of the respective items at the ECS application.

17. The computer-readable memory device of claim 16, wherein the instructions further comprise:
- when an item is changed in one of the ECS application and the CRM application, synchronizing the item such that the changes appear in both applications by comparing column differences using the XML data associated with the item from the ECS application and time stamps of the changes.

18. The computer-readable memory device of claim 17, wherein the instructions further comprise:
- when an item is changed in both the ECS application and the CRM application, synchronizing the changes bi-directionally according to the time stamps of the changes, so that a most recent change takes precedence and overrides earlier changes.

19. The computer-readable memory device of claim 16, wherein updating an item maintained by the ECS application corresponding to a changed item maintained by the CRM application includes:
- calling on the CRM application through a pre-synchronization Application Programming Interface (API);
- receiving a summary information associated with changed items at the CRM application in response to the call;
- submitting a data call on the CRM application with a column set that includes a CRM identifier and a time stamp of the changed items;
- receiving a list of changed items and changes;
- adding entries associated with the received changes to the ECS client cache; and
- calling on the CRM application through a post-synchronization API to report that the changes are processed at the ECS application.

* * * * *